(12) United States Patent
May et al.

(10) Patent No.: US 10,300,859 B2
(45) Date of Patent: May 28, 2019

(54) MULTI-SENSOR INTERIOR MIRROR DEVICE WITH IMAGE ADJUSTMENT

(71) Applicant: MAGNA ELECTRONICS INC., Auburn Hills, MI (US)

(72) Inventors: Benjamin May, Lübs (DE); Joern Ihlenburg, Berlin (DE); Boris Shulkin, West Bloomfield, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 169 days.

(21) Appl. No.: 15/617,216

(22) Filed: Jun. 8, 2017

(65) Prior Publication Data

US 2017/0355314 A1   Dec. 14, 2017

Related U.S. Application Data (60) Provisional application No. 62/348,458, filed on Jun. 10, 2016.

(51) Int. Cl.
*H04N 7/18* (2006.01)
*B60R 1/12* (2006.01)
(Continued)

(52) U.S. Cl.
CPC ............ *B60R 1/12* (2013.01); *G06K 9/00805* (2013.01); *H04N 5/23293* (2013.01);
(Continued)

(58) Field of Classification Search
CPC .. H04N 7/18; H04N 5/23293; H04N 5/23296; H04N 5/247; G06K 9/00805;
(Continued)

(56) References Cited

U.S. PATENT DOCUMENTS

| 5,550,677 A | 8/1996 | Schofield et al. |
| 5,670,935 A * | 9/1997 | Schofield ............... B60N 2/002 340/461 |

(Continued)

FOREIGN PATENT DOCUMENTS

| JP | 200274339 A | 3/2002 |
| JP | 20041658 A | 1/2004 |

OTHER PUBLICATIONS

Broggi et al., "Multi-Resolution Vehicle Detection Using Artificial Vision," IEEE Intelligent Vehicles Symposium, University of Parma, Italy, Jun. 14-17, 2004.

(Continued)

*Primary Examiner* — Trang U Tran
(74) *Attorney, Agent, or Firm* — Honigman LLP (57) ABSTRACT

A vision system for a vehicle includes a forward viewing camera disposed at a mirror head of an interior rearview mirror assembly of the vehicle and having a forward field of view through the windshield of the vehicle. A sensor is disposed at the mirror head and determines a change in position of the mirror head relative to a mirror mount of the mirror assembly when the vehicle driver adjusts the mirror head. A control includes a processor operable to process image data captured by the forward viewing camera. Responsive to determination by the sensor of a change of position of the forward viewing camera relative to the mirror mount, the control selects an active sub-array of photosensors to provide an effective field of view of the forward viewing camera. The processor processes image data captured by the active sub-array of photosensors for a driver assistance system of the vehicle.

20 Claims, 4 Drawing Sheets

(51) Int. Cl.
*H04N 5/247* (2006.01)
*G06K 9/00* (2006.01)
*H04N 5/232* (2006.01)
*B60R 1/04* (2006.01)

(52) U.S. Cl.
CPC ......... *H04N 5/23296* (2013.01); *H04N 5/247* (2013.01); *B60K 2350/106* (2013.01); *B60K 2350/1088* (2013.01); *B60K 2350/2013* (2013.01); *B60K 2350/2095* (2013.01); *B60K 2350/352* (2013.01); *B60K 2350/927* (2013.01); *B60R 1/04* (2013.01); *B60R 2001/1253* (2013.01); *B60R 2300/105* (2013.01); *B60R 2300/303* (2013.01); *B60R 2300/804* (2013.01); *B60R 2300/806* (2013.01); *B60R 2300/8033* (2013.01); *B60R 2300/8066* (2013.01); *B60R 2300/8086* (2013.01)

(58) Field of Classification Search
CPC ..... G06K 2350/106; G06K 2350/1088; G06K 2350/2013; G06K 2350/2095; G06K 2350/352; G06K 2350/927; B60R 1/12; B60R 1/04; B60R 2001/1253; B60R 2300/105; B60R 2300/303; B60R 2300/83; B60R 2300/804; B60R 2300/806; B60R 2300/8066; B60R 2300/8086
USPC .................................................. 348/148, 118
See application file for complete search history.

(56) References Cited

U.S. PATENT DOCUMENTS

| | | |
|---|---|---|
| 5,765,116 A | 6/1998 | Wilson-Jones et al. |
| 5,796,094 A | 8/1998 | Schofield et al. |
| 5,844,682 A | 12/1998 | Kiyomoto et al. |
| 5,850,176 A | 12/1998 | Kinoshita et al. |
| 5,850,254 A | 12/1998 | Takano et al. |
| 5,877,897 A | 3/1999 | Schofield et al. |
| 5,920,367 A | 7/1999 | Kajimoto et al. |
| 5,929,784 A | 7/1999 | Kawaziri et al. |
| 5,949,331 A | 9/1999 | Schofield et al. |
| 5,956,181 A | 9/1999 | Lin |
| 3,020,704 A | 2/2000 | Buschur |
| 6,044,321 A | 3/2000 | Nakamura et al. |
| 6,049,171 A | 4/2000 | Stam et al. |
| 6,049,619 A | 4/2000 | Anandan et al. |
| 6,052,124 A | 4/2000 | Stein et al. |
| 6,091,833 A | 7/2000 | Yasui et al. |
| 6,144,022 A | 11/2000 | Tenenbaum et al. |
| 6,169,940 B1 | 1/2001 | Jitsukata et al. |
| 6,173,222 B1 | 1/2001 | Seo et al. |
| 6,218,960 B1 | 4/2001 | Ishikawa et al. |
| 6,226,061 B1 | 5/2001 | Tagusa |
| 6,246,961 B1 | 6/2001 | Sasaki et al. |
| 6,249,214 B1 | 6/2001 | Kashiwazaki |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,292,111 B1 | 9/2001 | Ishikawa et al. |
| 6,313,454 B1 | 11/2001 | Bos et al. |
| 6,317,057 B1 | 11/2001 | Lee |
| 6,330,511 B2 | 12/2001 | Ogura et al. |
| 6,396,397 B1 | 5/2002 | Bos et al. |
| 6,424,273 B1 | 7/2002 | Gutta et al. |
| 6,430,303 B1 | 8/2002 | Naoi et al. |
| 6,539,306 B2 | 3/2003 | Turnbull |
| 6,542,840 B2 | 4/2003 | Okamoto et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,580,996 B1 | 6/2003 | Friedrich |
| 6,593,011 B2 | 7/2003 | Liu et al. |
| 6,631,316 B2 | 10/2003 | Stam et al. |
| 6,631,994 B2 | 10/2003 | Suzuki et al. |
| 6,671,607 B2 | 12/2003 | Ishizu et al. |
| 6,672,731 B2 | 1/2004 | Schnell et al. |
| 6,690,268 B2 | 2/2004 | Schofield et al. |
| 6,691,008 B2 | 2/2004 | Kondo et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,708,100 B2 | 3/2004 | Russell et al. |
| 6,711,474 B1 | 3/2004 | Treyz et al. |
| 6,714,331 B2 | 3/2004 | Lewis et al. |
| 6,744,353 B2 | 6/2004 | Sjonell |
| 6,748,312 B2 | 6/2004 | Russell et al. |
| 6,795,221 B1 | 9/2004 | Urey |
| 6,807,287 B1 | 10/2004 | Hermans |
| 6,813,371 B2 | 11/2004 | Kakinami |
| 6,823,241 B2 | 11/2004 | Shirato et al. |
| 6,864,930 B2 | 3/2005 | Matsushita et al. |
| 6,889,161 B2 | 5/2005 | Winner et al. |
| 6,909,753 B2 | 6/2005 | Meehan et al. |
| 6,917,693 B1 | 7/2005 | Kiridena et al. |
| 6,941,216 B2 | 9/2005 | Isogai et al. |
| 6,968,266 B2 | 11/2005 | Ahmed-Zaid et al. |
| 6,975,775 B2 | 12/2005 | Rykowski et al. |
| 7,038,577 B2 | 5/2006 | Pawlicki et al. |
| 7,049,945 B2 | 5/2006 | Breed et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,133,661 B2 | 11/2006 | Hatae et al. |
| 7,151,844 B2 | 12/2006 | Stevenson et al. |
| 7,151,996 B2 | 12/2006 | Stein |
| 7,227,611 B2 | 6/2007 | Hull et al. |
| 7,295,682 B2 | 11/2007 | Otsuka et al. |
| 7,338,177 B2 | 3/2008 | Lynam |
| 7,370,983 B2 * | 5/2008 | DeWind ................ B60K 35/00 359/844 |
| 7,375,803 B1 | 5/2008 | Bamji |
| 7,502,048 B2 | 3/2009 | Okamoto et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,720,580 B2 * | 5/2010 | Higgins-Luthman ..... B60R 1/00 701/28 |
| 7,729,580 B2 | 6/2010 | Tanaka et al. |
| 7,786,898 B2 | 8/2010 | Stein et al. |
| 7,843,451 B2 | 11/2010 | Lafon |
| 7,855,755 B2 | 12/2010 | Weller et al. |
| 7,855,778 B2 | 12/2010 | Yung et al. |
| 7,930,160 B1 | 4/2011 | Hosagrahara et al. |
| 7,949,486 B2 | 5/2011 | Denny et al. |
| 7,991,522 B2 | 8/2011 | Higgins-Luthman |
| 8,017,898 B2 | 9/2011 | Lu et al. |
| 8,064,643 B2 | 11/2011 | Stein et al. |
| 8,082,101 B2 | 12/2011 | Stein et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,553,088 B2 | 10/2013 | Stein et al. |
| 8,629,768 B2 * | 1/2014 | Bos ........................ B60N 2/002 340/461 |
| 2002/0005778 A1 | 1/2002 | Breed et al. |

(56) References Cited

U.S. PATENT DOCUMENTS

| | | |
|---|---|---|
| 2004/0164228 A1 | 8/2004 | Fogg et al. |
| 2005/0237385 A1 | 10/2005 | Kosaka et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2008/0266396 A1 | 10/2008 | Stein |
| 2012/0045112 A1 | 2/2012 | Lundblad et al. |
| 2012/0069185 A1 | 3/2012 | Stein |
| 2012/0200707 A1 | 8/2012 | Stein et al. |
| 2012/0314071 A1 | 12/2012 | Rosenbaum et al. |
| 2012/0320209 A1 | 12/2012 | Vico et al. |
| 2013/0141580 A1 | 6/2013 | Stein et al. |
| 2013/0147957 A1 | 6/2013 | Stein |
| 2013/0169812 A1 | 7/2013 | Lu et al. |
| 2013/0286193 A1 | 10/2013 | Pflug |
| 2014/0043473 A1 | 2/2014 | Gupta et al. |
| 2014/0063254 A1 | 3/2014 | Shi et al. |
| 2014/0098229 A1 | 4/2014 | Lu et al. |
| 2014/0247352 A1 | 9/2014 | Rathi et al. |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |

OTHER PUBLICATIONS

Broggi et al., "Automatic Vehicle Guidance: The Experience of the ARGO Vehicle," World Scientific, Singapore, 1999.

Kastrinaki et al., "A Survey of Video Processing Techniques for Traffic Applications," Image and Vision Computing 21, 2003.

Zehang el al., "On-road Vehicle Detection Using Optical Sensors: A Review," IEEE Conference on Intelligent Transportatation Systems Proceedings, pp. 585, 590, Oct. 3-6, 2004.

\* cited by examiner

MULTI-SENSOR INTERIOR MIRROR DEVICE WITH IMAGE ADJUSTMENT

CROSS REFERENCE TO RELATED APPLICATION

The present application claims the filing benefits of U.S. provisional application Ser. No. 62/348,458, filed Jun. 10, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides an exterior camera (such as a rearward viewing camera at a rear portion of the vehicle) and a processor and forward viewing camera disposed at an interior rearview mirror of the vehicle. The processor receives image data captured by the rearward viewing camera and images derived from the rearward camera's captured image data are displayed at a video display of the interior rearview mirror. An active area of the field of view of the forward viewing camera is adjustable to accommodate movement of the camera relative to the vehicle, such as when the interior mirror is adjusted by the driver to adjust the rearward field of view of the driver.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
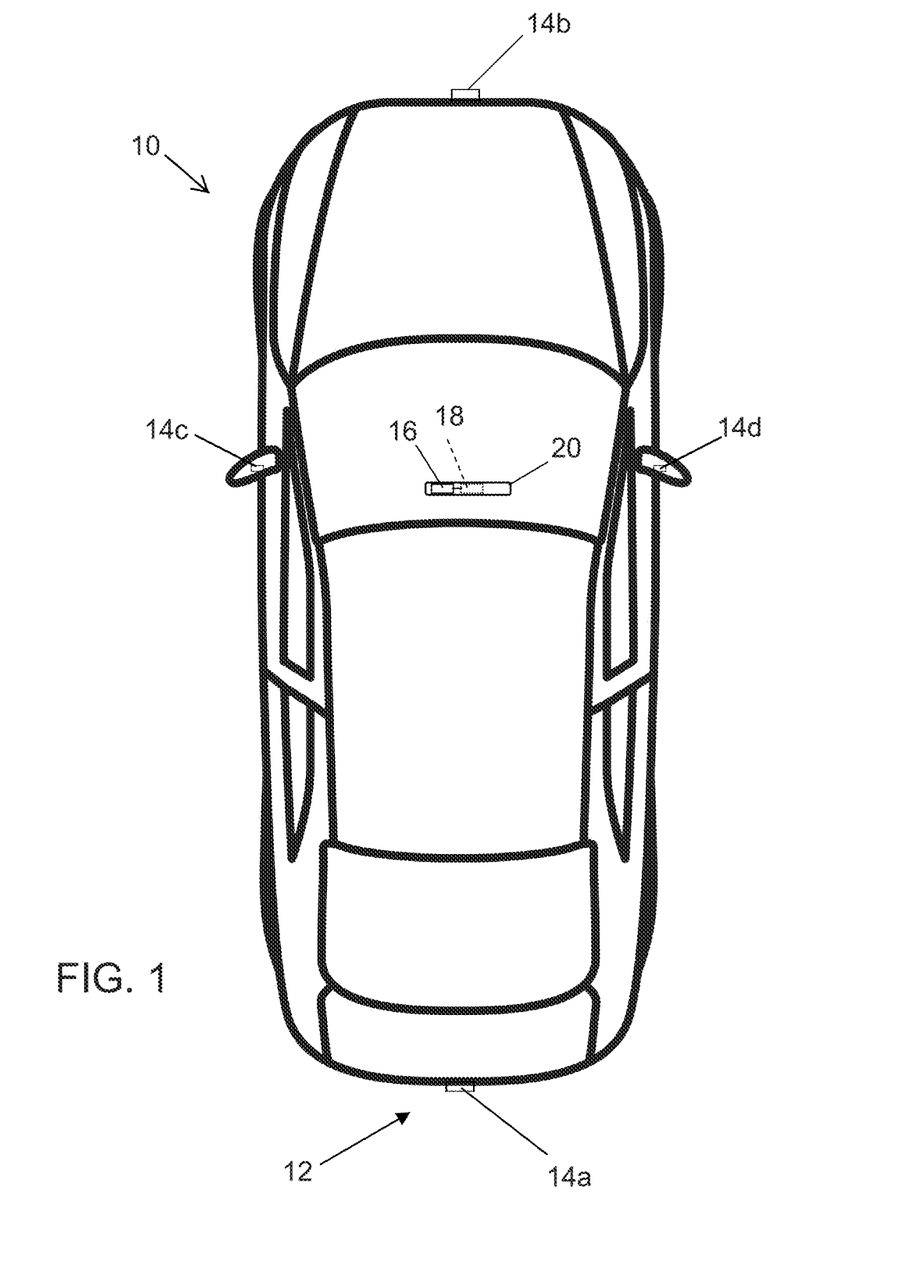
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
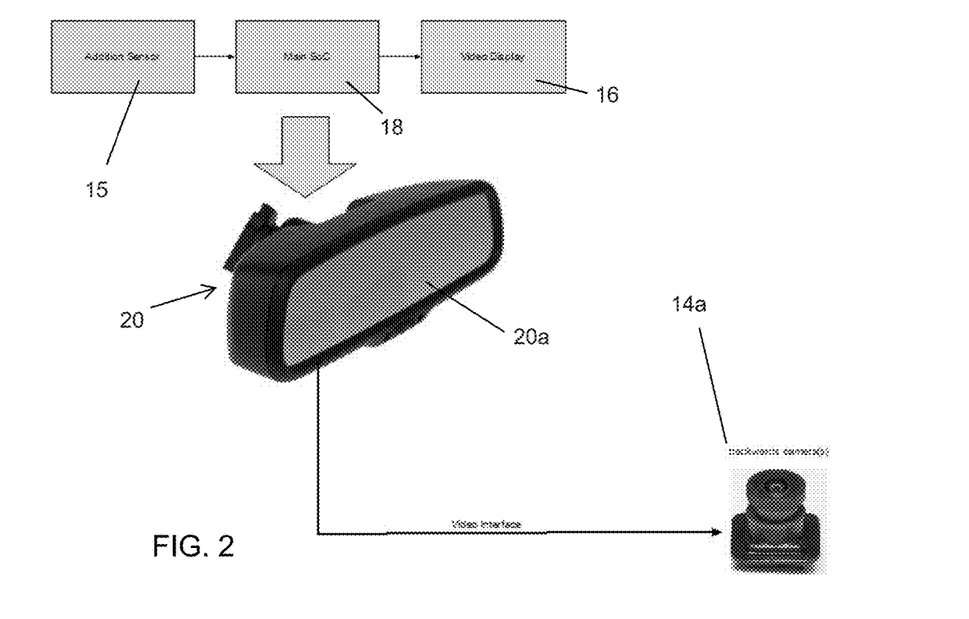
FIG. 2 is a perspective view of an interior rearview mirror assembly in communication with a vehicle camera in accordance with the present invention.

As shown in FIG. 2, the present invention provides a multi-sensor inside mirror device and vision system that includes an interior rearview mirror 20, one or more external cameras, including at least one rearward viewing camera or rear camera 14a, a video display screen 16 disposed at the mirror assembly (such as within the mirror head 20a so as to be viewable, when activated, through a transflective reflector of the mirror reflective element), and a processor 18 (preferably as part of a system on chip construction) disposed at the mirror assembly (such as within the mirror head). The system includes an additional forward viewing sensing path or sensor or forward viewing camera 15 integrated in the video mirror (such as within the mirror head so as to view forwardly through the windshield of the vehicle when the mirror assembly is mounted at an interior portion of the vehicle).

Images derived from image data captured by the rear camera(s) are displayed on the video display of the video mirror as a camera monitoring system (CMS) (and can be displayed during a reversing maneuver of the vehicle or a parking maneuver of the vehicle or the like). The rear camera may be part of a multi-camera surround view vision system of the vehicle, and the processor may receive image data from other cameras disposed at the vehicle with exterior fields of view, such as a forward viewing camera disposed at a front portion or bumper of the vehicle, a driver-side sideward viewing camera disposed at a driver side of the vehicle (such as at a driver-side exterior rearview mirror assembly) and a passenger-side sideward viewing camera disposed at a passenger side of the vehicle (such as at a passenger-side exterior rearview mirror assembly).

The system supports output of both object and video data for further processing in the vehicle. The system also includes a gyrosensor for positioning of the mirror and for determining a change in position of the mirror head (such as when the driver of the vehicle adjusts the mirror head to set a desired rearward field of view).

The forward sensor 15 is used for forward facing detection of safety related automotive advanced driver assistance systems (ADAS), optionally in combination with further sensors based on the overall system configuration. The sensor, optics and computing configuration are adapted to the feature integration and link for this component.

Figure 3:
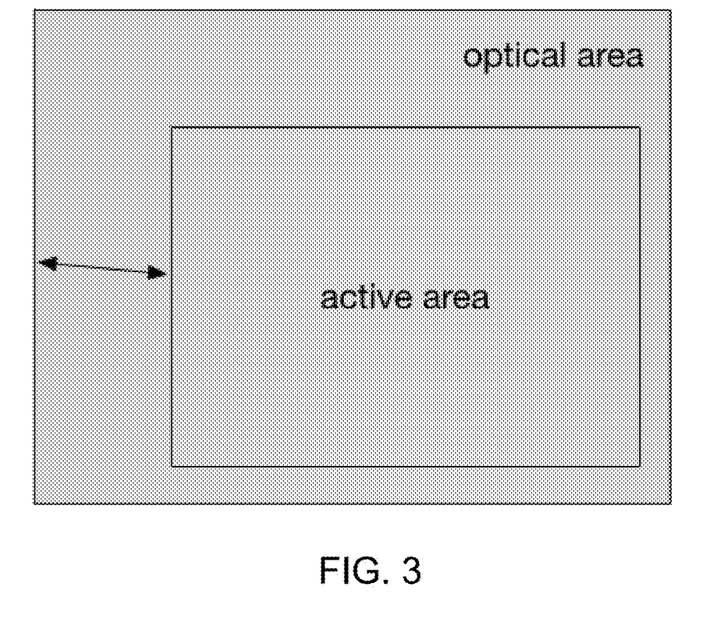
FIG. 3 is a schematic showing the sensor area of the camera and the smaller used active area that is adjustable in accordance with the present invention.
Figure 4:
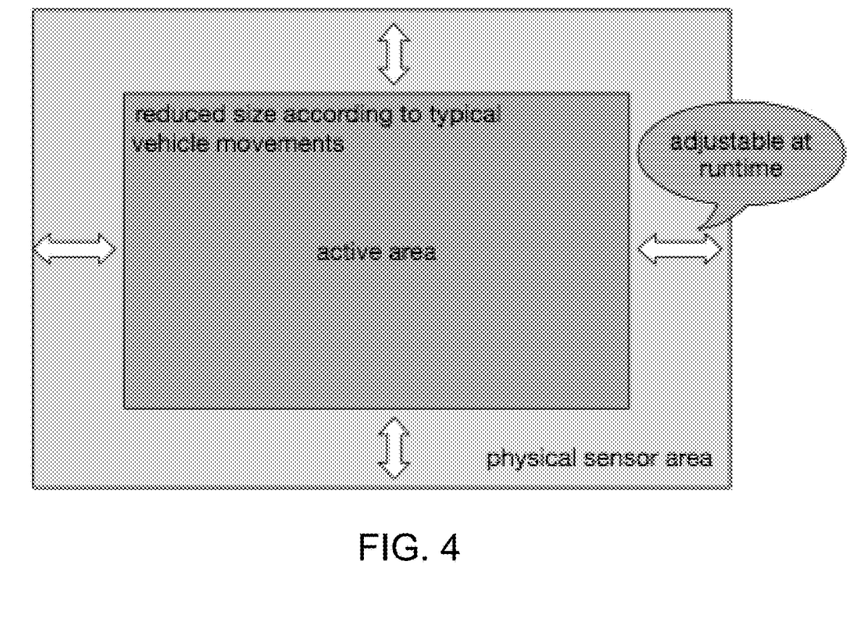
FIG. 4 is another schematic similar to FIG. 3, showing how the active area may adjust in position and size relative to the optical area or physical sensor area of the imaging array and camera.

The system also includes an electronic image adjustment feature that is used to overcome or accommodate for adjustment and movements of the mirror head and system (including the forward viewing camera disposed at the mirror) to stabilize the forward sensing path. The camera system that is used for either viewing or detection shall be used with a changeable active sensing area, such as shown in FIGS. 3 and 4.

The active area (i.e., the sub-array of photosensors that is part of but less than the total photosensor array whose pixels are used to capture image data) is adapted based on the movements of the overall system (such as, for example, the vehicle) or the sensing device holder (the mirror). Either external sensors (such as, for example, gyrosensors or accelerometers or the like) or movement detection features (such as, for example, optical flow) will be used to determine the movement of the optical path relative to the overall system such that the optical path (the field of view of the forward viewing camera) itself is compensated. The adaption is performed on a frame by frame basis. The active area is not limited to a rectangular shape and is linked to the dedicated optical system parameters.

Figure 5:
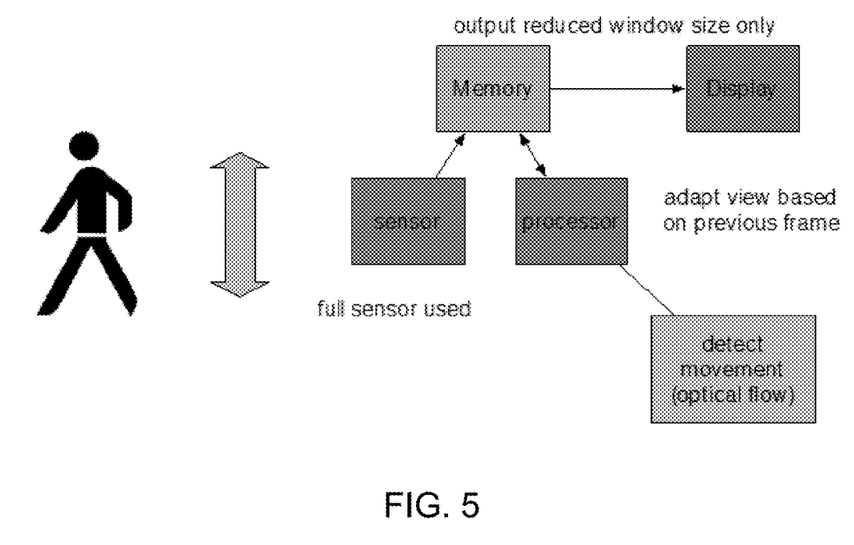
FIG. 5 is a block diagram showing adjustment of the used output of the sensor for displaying images, based on movement detection.
Figure 6:
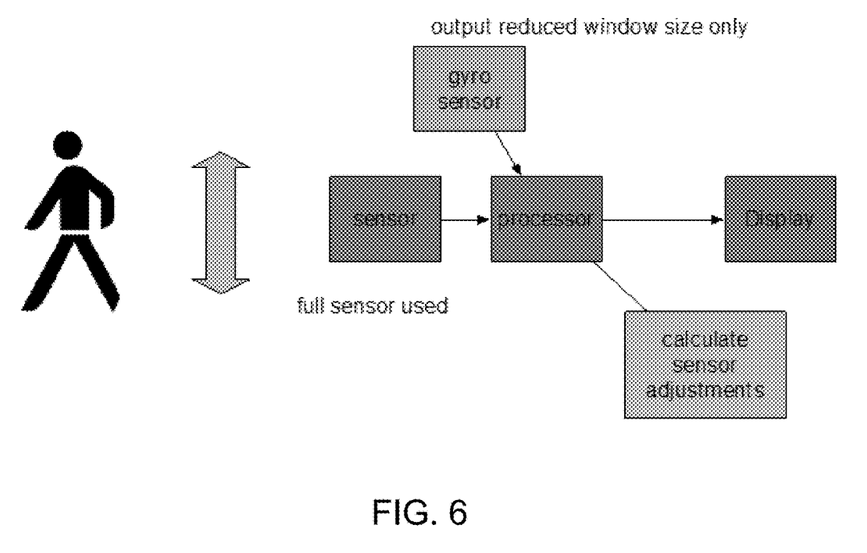
FIG. 6 is another block diagram showing adjustment of the active area of the sensor for displaying image, based on movement detection.

As shown in FIG. 5, the full sensor may be used to capture image data, and a portion of the captured image data may be extracted for display of images. The adjustment or adaptation of the view may be done in a subsequent from of captured image data (based on the previous or current frame of captured image data). Optionally, and such as shown in FIG. 6, a gyrosensor or the like may determine a change in position of the camera, whereby the control or processor may adjust the active or used portion of the captured image data. The processor processes image data captured by photosensors of the active area subset, such as for a driver assistance function (such as for lane departure warning, headlamp control, traffic sign recognition, and/or the like), and may not process photosensors outside of the active area subset.

For driver assistance systems such as lane departure warning, intelligent headlamp control, traffic sign recognition and/or the like, having a forward viewing camera with a fixed and predefined field of view and principal axis of that field of view is important. Preferably, the principal forward axis of the field of view of the forward viewing camera is boresighted with the direction of travel of the vehicle. However, an interior rearview mirror head is configured to be adjustable to meet the rearward viewing requirements of a particular driver driving that equipped vehicle. Thus, for example, a small stature driver will adjust the mirror head to one setting to view rearward through the rear window of the vehicle, whereas a taller driver will adjust the mirror head to a different setting to view rearward through that same rear window. For this reason, prior art forward facing camera-equipped interior rearview mirror assemblies have fixedly incorporated the forward viewing camera into the attachment portion or mirror mount of the interior rearview mirror assembly (typically a single ball mounted interior rearview mirror assembly) such that the alignment and forward viewing orientation remains unaffected and is not changed when the driver adjusts the mirror head about the ball and socket joint that joins the mirror head to the fixed mirror mount. The present invention allows incorporation of the forward viewing camera into the movable or adjustable mirror head and the image adjustment ensures that, regardless of the movement or adjustment of the mirror head relative to the fixed mirror mount, the active pixel area of the imager of the camera is always the desired boresighted imaging region that enables and allows the ADAS functionality.

Thus, the present invention allows for a forward viewing camera to be disposed at the mirror head of the interior rearview mirror assembly and does not require separate mounting of a forward viewing camera at a windshield module or the like. Thus, in this configuration, the standard (windshield module) forward facing configuration becomes unnecessary.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. U.S. 2014-0340510; U.S. 2014-0313339; U.S. 2014-0347486; U.S. 2014-0320658; U.S. 2014-0336876; U.S. 2014-0307095; U.S. 2014-0327774; U.S. 2014-0327772; U.S. 2014-0320636; U.S. 2014-0293057; U.S. 2014-0309884; U.S. 2014-0226012; U.S. 2014-0293042; U.S. 2014-0218535; U.S. 2014-0218535; U.S. 2014-0247354; U.S. 2014-0247355; U.S. 2014-0247352; U.S. 2014-0232869; U.S. 2014-0211009; U.S. 2014-0160276; U.S. 2014-0168437; U.S. 2014-0168415; U.S. 2014-0160291; U.S. 2014-0152825; U.S. 2014-0139676; U.S. 2014-0138140; U.S. 2014-0104426; U.S. 2014-0098229; U.S. 2014-0085472; U.S. 2014-0067206; U.S. 2014-0049646; U.S. 2014-0052340; U.S. 2014-0025240; U.S. 2014-0028852; U.S. 2014-005907; U.S. 2013-0314503; U.S. 2013-0298866; U.S. 2013-0222593; U.S. 2013-0300869; U.S. 2013-0278769; U.S. 2013-0258077; U.S. 2013-0258077; U.S. 2013-0242099; U.S. 2013-0215271; U.S. 2013-0141578 and/or U.S. 2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727 5,878,370; 6,087,953; 6,173,508; 6,222,460; 6,513,252 and/or 6,642,851, and/or U.S. Publication Nos. U.S. 2012-0162427; U.S. 2006-0050018 and/or U.S. 2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. U.S. 2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:

an interior rearview mirror assembly comprising a mirror head and a mirror mount, wherein said mirror mount is fixedly attached at an interior portion of the vehicle, and wherein said mirror head is pivotally mounted at said mirror mount and is adjustable relative to said mirror mount to adjust a rearward field of view of a driver of the vehicle when viewing a mirror reflective element of said mirror head;

a forward viewing camera disposed at said mirror head of said interior rearview mirror assembly and having a forward field of view through the windshield of the vehicle, wherein said forward viewing camera comprises a photosensor array having multiple columns and rows of photosensor elements;

wherein the forward field of view of said forward viewing camera adjusts in tandem with adjustment of said mirror head;

a sensor disposed at said mirror head and operable to determine a change in position of said mirror head relative to said mirror mount;

a control comprising a processor operable to process image data captured by said forward viewing camera;

wherein, responsive to determination by said sensor of a change of position of said mirror head relative to said mirror mount, said control selects an active sub-array of photosensors to provide an effective field of view of said forward viewing camera;

wherein said processor processes image data captured by the active sub-array of photosensors for a driver assistance system of the vehicle; and wherein the active sub-array of photosensors comprises a subset of photosensors of said photosensor array that is less than the entirety of the rows and columns of photosensor elements of said photosensor array.

2. The vision system of claim 1, wherein said processor does not process image data captured by photosensors that are not part of the active sub-array of photosensors.

3. The vision system of claim 1, wherein said control adjusts the active sub-array of photosensors to accommodate for movement of said forward viewing camera relative to said mirror mount based on the determined change of position of said mirror head when the driver adjusts the rearward field of view provided by said interior rearview mirror assembly.

4. The vision system of claim 1, wherein said control adjusts the active sub-array of photosensors on a frame by frame basis.

5. The vision system of claim 1, wherein said control adjusts the active sub-array of photosensors responsive to determination of a change in the camera's field of view relative to the vehicle.

6. The vision system of claim 1, wherein said sensor comprises a motion sensor.

7. The vision system of claim 1, wherein said sensor comprises a gyrosensor.

8. The vision system of claim 1, comprising a rearward viewing camera configured to be disposed at a vehicle and having a rearward field of view exterior of the vehicle.

9. The vision system of claim 8, wherein said rearward viewing camera is part of a multi-camera surround view vision system of the vehicle.

10. The vision system of claim 9, wherein said control receives image data captured by said rearward viewing camera and other cameras disposed at the vehicle and having respective exterior fields of view.

11. The vision system of claim 9, wherein said other cameras comprise (i) a forward viewing camera disposed at a front portion of the vehicle, (ii) a driver-side sideward viewing camera disposed at a driver side of the vehicle and (iii) a passenger-side sideward viewing camera disposed at a passenger side of the vehicle.

12. The vision system of claim 8, comprising a display disposed operable to display video images derived from image data captured by said rearward viewing camera.

13. The vision system of claim 12, wherein said display is disposed at said mirror head and viewable through said mirror reflective element of said interior rearview mirror assembly.

14. A vision system for a vehicle, said vision system comprising:
an interior rearview mirror assembly comprising a mirror head and a mirror mount, wherein said mirror mount is fixedly attached at an interior portion of the vehicle, and wherein said mirror head is pivotally mounted at said mirror mount and is adjustable relative to said mirror mount to adjust a rearward field of view of a driver of the vehicle when viewing a mirror reflective element of said mirror head;
a forward viewing camera disposed at said mirror head of said interior rearview mirror assembly and having a forward field of view through the windshield of the vehicle, wherein said forward viewing camera comprises a photosensor array having multiple columns and rows of photosensor elements;
wherein the forward field of view of said forward viewing camera adjusts in tandem with adjustment of said mirror head;
a sensor disposed at said mirror head and operable to determine a change in position of said mirror head relative to said mirror mount;
a control comprising a processor operable to process image data captured by said forward viewing camera;
wherein, responsive to determination by said sensor of a change of position of said mirror head relative to said mirror mount, said control selects an active sub-array of photosensors to provide an effective field of view of said forward viewing camera;
wherein said control adjusts the active sub-array of photosensors to accommodate for movement of said forward viewing camera relative to said mirror mount based on the determined change of position of said mirror head when the driver adjusts the rearward field of view provided by said interior rearview mirror assembly;
wherein said processor processes image data captured by the active sub-array of photosensors for a driver assistance system of the vehicle;
wherein the active sub-array of photosensors comprises a subset of photosensors of said photosensor array that is less than the entirety of the rows and columns of photosensor elements of said photosensor array; and
wherein said processor does not process image data captured by photosensors that are not part of the active sub-array of photosensors.

15. The vision system of claim 14, wherein said sensor comprises a motion sensor.

16. The vision system of claim 14, comprising a display disposed operable to display video images derived from image data captured by a rearward viewing camera disposed at a rear portion of the vehicle and viewing rearward of the vehicle.

17. A vision system for a vehicle, said vision system comprising:
an interior rearview mirror assembly comprising a mirror head and a mirror mount, wherein said mirror mount is fixedly attached at an interior portion of the vehicle, and wherein said mirror head is pivotally mounted at said mirror mount and is adjustable relative to said mirror mount to adjust a rearward field of view of a driver of the vehicle when viewing a mirror reflective element of said mirror head;
a rearward viewing camera configured to be disposed at a vehicle and having a rearward field of view exterior of the vehicle;
a forward viewing camera disposed at said mirror head of said interior rearview mirror assembly and having a forward field of view through the windshield of the vehicle, wherein said forward viewing camera comprises a photosensor array having multiple columns and rows of photosensor elements;
wherein the forward field of view of said forward viewing camera adjusts in tandem with adjustment of said mirror head;
a sensor disposed at said mirror head and operable to determine a change in position of said mirror head relative to said mirror mount;
a control comprising a processor operable to process image data captured by said rearward viewing camera and said forward viewing camera;
wherein, responsive to determination by said sensor of a change of position of said mirror head relative to said mirror mount, said control selects an active sub-array of photosensors to provide an effective field of view of said forward viewing camera;
wherein said processor processes image data captured by the active sub-array of photosensors for a driver assistance system of the vehicle;
wherein the active sub-array of photosensors comprises a subset of photosensors of said photosensor array that is less than the entirety of the rows and columns of photosensor elements of said photosensor array;

wherein said processor does not process image data captured by photosensors that are not part of the active sub-array of photosensors; and a display disposed operable to display video images derived from image data captured by said rearward viewing camera.

18. The vision system of claim 17, wherein said sensor comprises a motion sensor.

19. The vision system of claim 17, wherein said rearward viewing camera is part of a multi-camera surround view vision system of the vehicle, and wherein said other cameras comprise (i) a forward viewing camera disposed at a front portion of the vehicle, (ii) a driver-side sideward viewing camera disposed at a driver side of the vehicle and (iii) a passenger-side sideward viewing camera disposed at a passenger side of the vehicle.

20. The vision system of claim 17, wherein said display is disposed at said mirror head and viewable through said mirror reflective element of said interior rearview mirror assembly.

* * * * *